(No Model.) 2 Sheets—Sheet 1.
J. REILLY.
APPARATUS FOR HEATING HOT HOUSES.
No. 411,531. Patented Sept. 24, 1889.
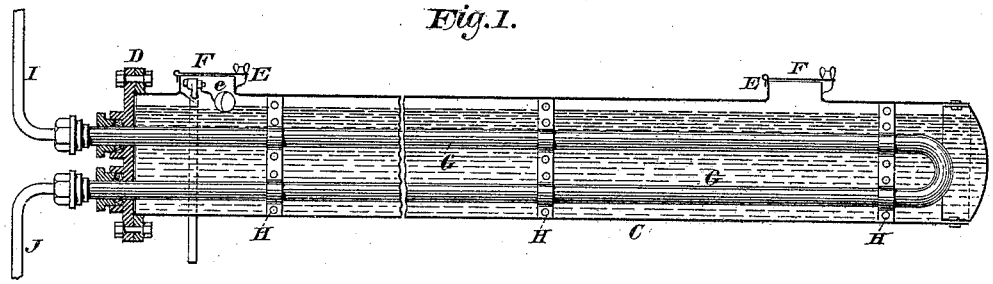
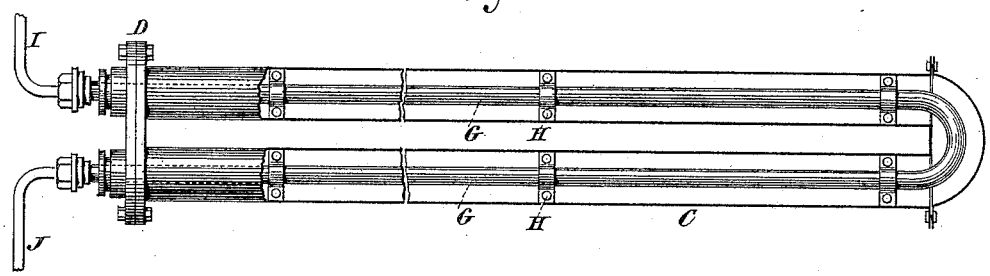
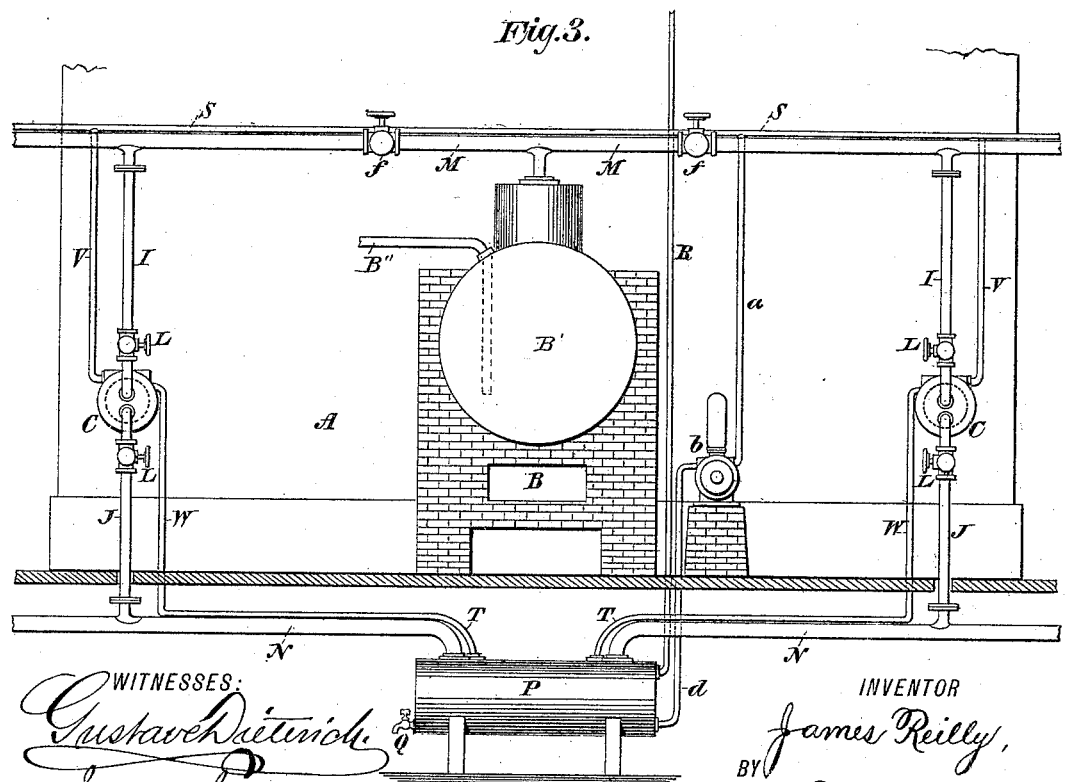

(No Model.) 2 Sheets—Sheet 2.
J. REILLY.
APPARATUS FOR HEATING HOT HOUSES.
No. 411,531. Patented Sept. 24, 1889.
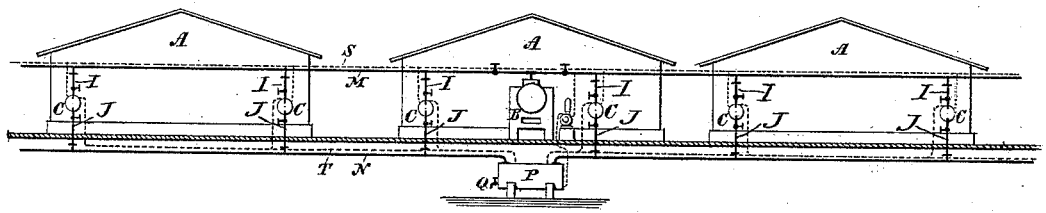
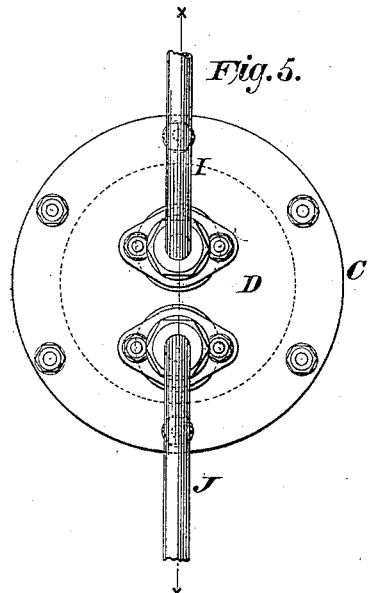
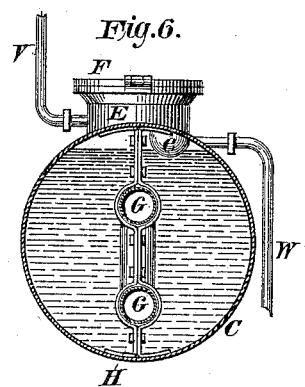
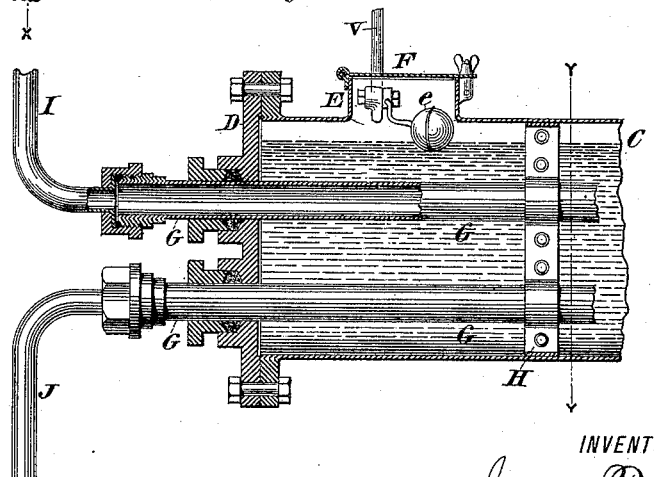
WITNESSES:
Gustave Dieterich
W. C. Matthis
INVENTOR
James Reilly,
BY
Chas. E. Gill
ATTORNEY

UNITED STATES PATENT OFFICE.

JAMES REILLY, OF BROOKLYN, NEW YORK.

APPARATUS FOR HEATING HOT-HOUSES.

SPECIFICATION forming part of Letters Patent No. 411,531, dated September 24, 1889.

Application filed December 6, 1887. Serial No. 257,090. (No model.)

*To all whom it may concern:*

Be it known that I, JAMES REILLY, a citizen of the United States, and a resident of Brooklyn, in the county of Kings and State of New York, have invented certain new and useful Improvements in Apparatus for Heating Hot-Houses, of which the following is a specification.

The invention relates to improvements in apparatus for heating hot-houses, and its object is to afford a means of heating which will render it possible to dispense with the present expensive system of apparatus for heating now in use in the larger hot-houses, and which will enable the attendant to regulate the degree of heat and the condition of the atmosphere, as far as humidity is concerned, at will.

The apparatus constituting the invention is reduced in weight and expense to the minimum degree. It is not liable to corrode. It does not involve the employment of the expensive and heavy machinery and furnaces now in use for heating and circulating large bodies of water through the various apartments of the hot-houses, and the cost of maintaining the apparatus embodied therein as compared with that of the apparatus heretofore in use for the like purpose is slight.

According to the present invention the main body of water remains stationary in thin copper receptacles located in the various hot-houses and is heated by pipes therein, which are supplied with steam from a single boiler, the water from the condensed steam being led to a tank and from that pumped into the hot-water receptacle through a series of pipes.

The apparatus sought to be protected hereby will be understood from the detailed description hereinafter presented, and is pointed out in the claims.

Referring to the accompanying drawings, Figure 1 is a central vertical longitudinal section of one of the hot-water receptacles made in the form of a single cylinder with the steam-pipe therein; Fig. 2, a like view of a hot-water receptacle made in the form of two connected cylinders, the steam-pipe having one of its arms in one cylinder and the other in the second cylinder. Fig. 3 is a front end view of one apartment of a set of hot-houses, illustrating the application thereto of the arrangement of devices constituting the invention. Fig. 4 is a front end view of a series of hot-houses on a reduced scale employing the invention. Fig. 5 is an enlarged end view of one of the hot-water receptacles with a section of the ingress and egress steam-pipes; and Fig. 6 is a sectional view through one of the hot-water receptacles on the dotted line Y Y of Fig. 7, which is a central vertical longitudinal section of one end of the hot-water receptacle on the dotted line X X of Fig. 5.

In the drawings, A designates the hot-houses, and B the furnace for heating the water. At the sides of each hot-house, and running the entire length of same, are arranged the hot-water receptacles C C, which correspond with each other, and the length and dimensions of which will be regulated according to the size of the hot-houses. The receptacles C C are made from thin copper, and have the cast-iron head D at one end and the upright pipes or sections E distributed at suitable distances apart along their upper surface. The sections E are provided with covers F, which may be opened or closed at will. Within each receptacle C is arranged the steam-pipe G, one arm of which extends along the upper part of the receptacle, while the lower arm, constituting a return, passes along the lower portion of the same, as shown in Fig. 1. The pipe G is sustained in brackets or supports H within the receptacle, and its ends, after protruding through stuffing-boxes in the cast head D, are coupled with the smaller steam-pipes lettered I J, respectively, which are supplied with valves L, and connect, respectively, with the steam-pipes M N, extending, as shown in Fig. 4, in front of all of the hot-houses. Each receptacle C is furnished with the pipe G and the pipes I J, and all these pipes I J connect, respectively, with the main steam-pipes M N; hence the one set of steam-pipes M N is sufficient for all of the pipes G in the hot-water receptacles C. The pipe M is connected with the steam-dome of the boiler, as shown in Figs. 3 and 4, and the pipes N lead into the tank P, which has a discharge-cock Q and an open pipe R, extending upward to about the top of the hot-house. In addition to the steam-pipes M N, extending transversely in front of the hot-houses, there are provided the water-pipes lettered S T, respectively, (shown by full lines in Fig. 3 and by dotted lines in Fig. 4,) the pipe S being connected by the pipes V with the water-receptacles C at their upper portions, and the pipes T also leading into the tank P and being in connection with the water-receptacles by means of the pipes W. It will be seen that the one set of pipes S T answers for all of the hot-houses, being connected with the receptacles C in each thereof by the pipes V W. The pipe S is connected by a pipe $a$ with the pump $b$, and this is connected with the tank P by a pipe $d$. Within each receptacle C is arranged the ball-valve $e$, which is a float carried upon the surface of the water, and its purpose is to maintain the desired water-level in the receptacles.

The size of the steam-pipes G will be such as to afford the required heating-surfaces for the water within the receptacles C.

In the use of the apparatus hereinbefore described the receptacles C will be filled with water to the desired level, the fire started in the furnace, and the valves $f f$ in the steam-pipe M opened, the effect of which will be that the steam from the steam-dome of the boiler will pass through the pipe M and into all of the pipes I, whence it will pass into all of the pipes G and escape therefrom through the pipes J into the pipes N, the condensed steam or water then flowing into the tank P.

During the operation of the apparatus the pump $b$ may be set in motion for the purpose of pumping the water, which will be in a heated condition, from the tank P up through the pipes $d$ and $a$ into the water-pipe S, from which the water will descend through the pipes V into the water-receptacles C, so as to maintain at all times the desired water-level therein, the surplus water escaping through the pipes W into the pipes T, whence it will pass into the tank P and finally be returned, owing to the pump $b$, through the water-pipes again. It should be noted that the circulation of the water by means of the pump $b$ does not imply that the main body of water in the receptacle C is put into circulation, but simply that the water from condensed steam and any surplus water fed to the receptacles are circulated through the pipes and compensate for any evaporation in the receptacles by acting as a cut-off for the inlet-pipes V, as shown enlarged in Fig. 7. The pump $b$ will only be used when it is desired to increase the body of water in the receptacles C C and will be provided with the usual relief-valve of common form, so as to relieve the pressure when the valve $e$ closes the pipes V. The boiler B' will be fed with water in the customary manner through the pipe B², connected with the usual force-pump. (Not shown.)

In view of the fact that the main body of water is not put into circulation the receptacles C may be constructed of thin copper, and this is of great advantage, since the receptacles are frequently as much as one hundred and fifty feet in length, and if made of cast-iron would be very heavy. The use of copper also prevents the corrosion of the receptacles, and the water in them may be quickly heated by the steam-pipes G and impart that heat to the atmosphere within the hot-houses. Should it be desired at any time to add moisture to the atmosphere, the covers F may be raised and steam allowed to escape into the houses from the receptacles C.

What I claim as my invention, and desire to secure by Letters Patent, is—

1. In apparatus for heating hot-houses, the hot-water receptacles C C and the steam-pipes G therein, combined with the furnace and boiler, the main steam-pipe M, leading from said boiler and extending along the houses, the return-pipes N for condensed steam, pipes I, connecting the pipes G with pipe M, pipes J, connecting the outlet end of pipes G with pipes N, the tank P, connected with pipes N, the main water-pipe S, connected with the pump, and the water-pipes V W, leading, respectively, to and from said receptacles C C, substantially as and for the purposes set forth.

2. In heating apparatus for hot-houses, the elongated copper hot-water receptacle C, having covered sections E on its upper side and a cast-metal end D, provided with stuffing-boxes, combined with the steam-pipe G therein, pipes I J, connected with ends of pipe G, main supply and return pipes in communication with pipes I J, supply and escape pipes V W for water, the float-valve $e$ within said receptacle to close pipe V, and mechanism, substantially as described, for supplying the steam and water, substantially as set forth.

Signed at New York, in the county of New York and State of New York, this 1st day of December, A. D. 1887.

JAMES REILLY.

Witnesses:
 CHAS. C. GILL,
 W. A. C. MATTHIE.